(12) United States Patent
Ghazi-Moghadam et al.

(10) Patent No.: US 8,223,903 B2
(45) Date of Patent: Jul. 17, 2012

(54) METHOD FOR ERROR COMPENSATION IN AN OFDM SYSTEM WITH DIVERSITY

(75) Inventors: Vafa Ghazi-Moghadam, Kirkland, WA (US); Titus Lo, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 928 days.

(21) Appl. No.: 12/235,449

(22) Filed: Sep. 22, 2008

(65) Prior Publication Data

US 2009/0016468 A1 Jan. 15, 2009

Related U.S. Application Data

(63) Continuation of application No. 10/850,109, filed on May 21, 2004, now Pat. No. 7,428,285, which is a continuation of application No. 10/176,643, filed on Jun. 24, 2002, now Pat. No. 6,901,125, which is a continuation of application No. 09/321,457, filed on May 27, 1999, now Pat. No. 6,442,222.

(60) Provisional application No. 60/113,926, filed on Dec. 24, 1998.

(51) Int. Cl.
  *H04L 1/02* (2006.01)

(52) U.S. Cl. .................................. 375/347; 455/272
(58) Field of Classification Search .............. 375/260, 375/267, 340, 347, 324, 325, 349, 362, 364–367; 370/509, 510, 512–515; 455/272, 273
See application file for complete search history.

(56) References Cited

U.S. PATENT DOCUMENTS

| | | | |
|---|---|---|---|
| 5,875,215 A * | 2/1999 | Dobrica | 375/344 |
| 5,920,598 A * | 7/1999 | Hyakudai et al. | 375/316 |
| 5,933,421 A | 8/1999 | Alamouti et al. | |
| 6,128,276 A | 10/2000 | Agee | |
| 6,178,194 B1 | 1/2001 | Vasic | |
| 6,304,624 B1 | 10/2001 | Seki et al. | |
| 6,359,923 B1 | 3/2002 | Agee et al. | |
| 6,442,222 B1 | 8/2002 | Ghazi-Moghadam et al. | |
| 6,901,125 B2 | 5/2005 | Ghazi-Moghadam et al. | |
| 7,428,285 B2 | 9/2008 | Ghazi-Moghadam et al. | |

* cited by examiner

*Primary Examiner* — Dac Ha
(74) *Attorney, Agent, or Firm* — Zagorin O'Brien Graham LLP

(57) ABSTRACT

A method provides for an improved compensation Fourier channel characteristics in a wireless communication embodiment. The method identifies one or more information carriers as pseudo pilot tones whose information may be realized to enhance the determination of the complex coefficient of the communication channel.

20 Claims, 4 Drawing Sheets

METHOD FOR ERROR COMPENSATION IN AN OFDM SYSTEM WITH DIVERSITY

CROSS-REFERENCE TO RELATED APPLICATIONS

This application is a continuation of U.S. application Ser. No. 10/850,109 filed 21 May 2004 (assigned U.S. Pat. No. 7,428,285), which is a continuation of Ser. No. 10/176,643, filed Jun. 24, 2002, U.S. Pat. No. 6,901,125. U.S. application Ser. No. 10/176,643 is a continuation of U.S. application Ser. No. 09/321,457, filed May 27, 1999, U.S. Pat. No. 6,442,222 B1. application Ser. No. 09/321,457 claims the benefit of U.S. provisional application Ser. No. 60/113,926 filed on Dec. 24, 1998 and entitled "METHOD FOR ERROR COMPENSATION IN AN OFDM SYSTEM WITH DIVERSITY".

BACKGROUND OF THE INVENTION

The present invention is directed to a method for error compensation in a communication transmission environment. More particularly, the present invention is directed to a method for providing for channel compensation in a multicarrier tone environment whereby the method minimizes the number of pilot tones needed to estimate a complex channel coefficient.

Wireless communications have become a popular mode by which users can exchange voice and/or data information. In fact, wireless communications, which initially were thought to be primarily useful for establishing mobile communication systems, have also become a popular option for extending access to subscribers without requiring the outlay of additional resources and labor to put wireline configurations into place. For example, it has been proposed to provide a service referred to as "fixed wireless" as an alternative to wireline connections into local exchange carriers. The fixed wireless service provider would then be able to provide local service to a fixed location, for instance, a subscriber's home, without having to incur the expense of placing cables or wires to each subscriber in a geographic region.

As wireless communications have become more popular, service providers have explored different options for transmitting and receiving these communication signals. In so doing, designers have taken into account the possible negative impacts of wireless communications such as those arising from multi-path fading. It has been determined that orthogonal frequency division multiplexing (OFDM) is al effective scheme for combating adverse effects of multi-path fading. In OFDM a plurality of tones or subcarrier frequencies are used to carry information via an over-the-air channel. FIG. 1 illustrates how a plurality of carrier tones $f_1$ to $f_k$ constitute the carrier signal and that signal can be produced at time intervals with the interval selected to avoid the impact of certain delays arising in the communication path, Modulation of information onto the carriers can be performed by a simple inverse discrete Fourier transform (IDFT) which can be implemented very efficiently as an inverse fast Fourier transform (IFFT). In such an arrangement, a receiver needs a fast Fourier transform (FFT) device in processing the received signal to reverse the modulation operation. The specimen of the subcarriers in the OFDM environment is permitted to overlay to some degree since the orthogonality relationship between the signals provides the appropriate separation between the carriers.

Both coherent and incoherent modulation schemes can be used in OFDM. Since coherent schemes have better performance, they are used in most OFDM systems. In practice, the transmitted symbols transported on the OFDM signals on the over-the-air channel are disturbed by the physical channel which is said to include the transmitter, the propagation channel, and the receiver itself. The disturbance can be represented or characterized in the form of a multiplicative complex coefficient. In the case that the bandwidth of an OFDM channel is sufficiently narrow, one may assume a model with a complex coefficient is common to all the subcarriers (or tones) across the channel. This complex coefficient has to be estimated and then removed or compensated for.

One well known technique for estimating the physical channel coefficient is to transmit one or more pilot symbols along with information symbols on the carriers. By pilot symbols we mean a known symbol at a particular tone. At the receiver, knowing the symbol that is expected to be received on a given tone, the receiver can estimate the complex coefficient. The receiver can then apply the inverse of this coefficient to the other information symbols, thereby compensating for channel disturbances to the information symbols. Following the compensation process, signals from different receiving branches are combined for diversity gain. Decisions as to the content of the information symbols are made based on the combined signals.

Even using this pilot symbol detection technique, symbol errors may arise because the received pilot signals are contaminated by noise. This means that the detected coefficient estimation is inaccurate to some extent. It is expected that the noise will not have the stable characteristics that the remainder of the channel coefficient may have and in fact may vary with time and frequency. Thus, it would be beneficial if there was some way to reduce the effect of this noise since the inaccuracy it introduces will typically degrade the system performance by 3 dB in terms of the signal to noise ratio (SNR).

A number of solutions have been considered in attempting to overcome this problem. One solution is to introduce additional pilots into the system. By using additional pilots there are further reference points for detecting the complex coefficient and noise terms. The drawback from this technique is that with each pilot used the spectrum efficiency of the spectrum is reduced since the number of information carrying tones is reduced. Simply put, additional pilots require additional channel space. A second option is to boost the power of the pilot tone so that the signal-to-noise ratio of the pilot signal is higher than that of the data signals. This would mean that upon detection of the pilot tone it would presumably be a more accurate detection of the complex coefficient as the impact from noise would be smaller or reduced. This solution has its own cost in that as one boosts the power of the pilot tone there is a higher likelihood that there would be interference with adjacent tones.

It would be beneficial if there was a technique for improving the channel compensation operation to take into account the presence of noise without significantly reducing channel capacity or increasing the probability of interference between carrier tones.

SUMMARY OF THE INVENTION

The present invention provides a method for channel compensation which improves upon the known system of employing pilot tones for estimation of the complex coefficient of the transmission channel. More particularly the present invention provides a technique by which a pilot tone is used to generate an initial correction coefficient. This correction coefficient is used in connection with the processing of information tones whereby a subset of all of the information tones are treated as if they were pilot tones when it is determined that the probability that their symbols have been accurately detected exceeds a particular threshold. These are so-called pseudo pilot tones. These pseudo pilot tones increase the reference base for the coefficient calculation so that it is as if the system is utilizing multiple pilot tones for generating the complex coefficient of the channel and yet it still keeps a higher spectrum efficiency since these pseudo pilot tones carry information over the channel. The pseudo pilot tones are used to generate an enhanced or secondary error estimation which in turn is used to correct the information signals in a manner that has been detected to be more accurate. Thus, the impacts of the channel are more completely compensated using this enhanced or secondary error estimation based on actual information carrying tones.

The present invention maintains spectrum efficiency while improving estimation of the complex coefficient of the channel which in turn improves the symbol error rate without need of introducing additional sources of interference.

DETAILED DESCRIPTION

Figure 1:
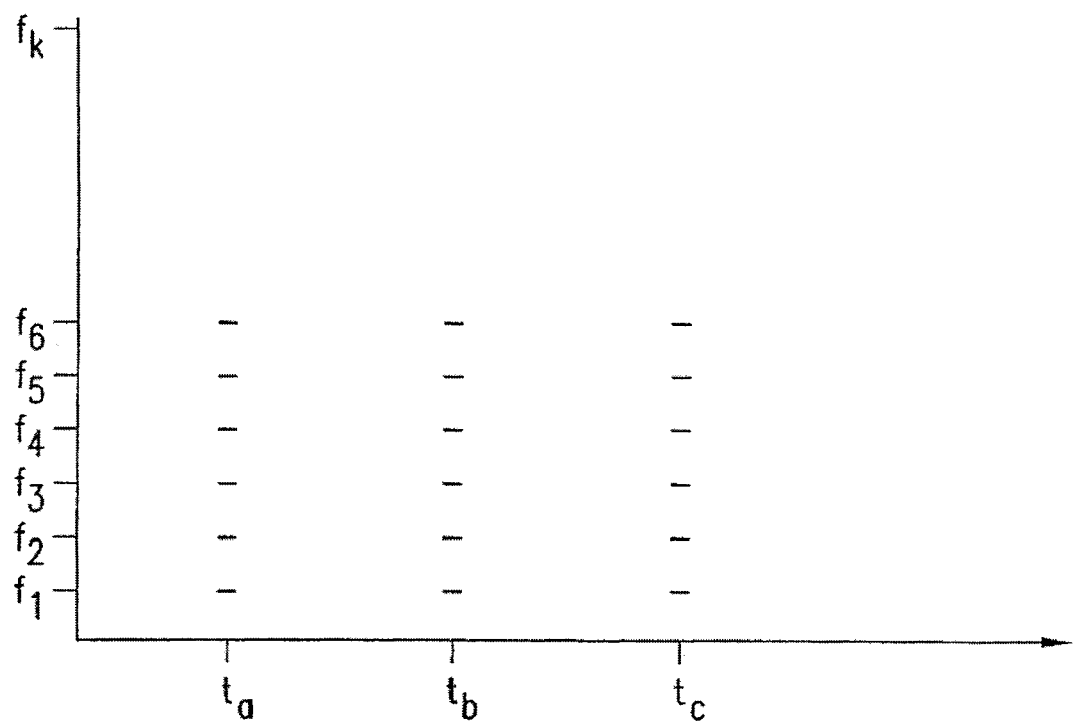
FIG. 1 provides an illustration for understanding a multi-tone carrier signal.
Figure 2:
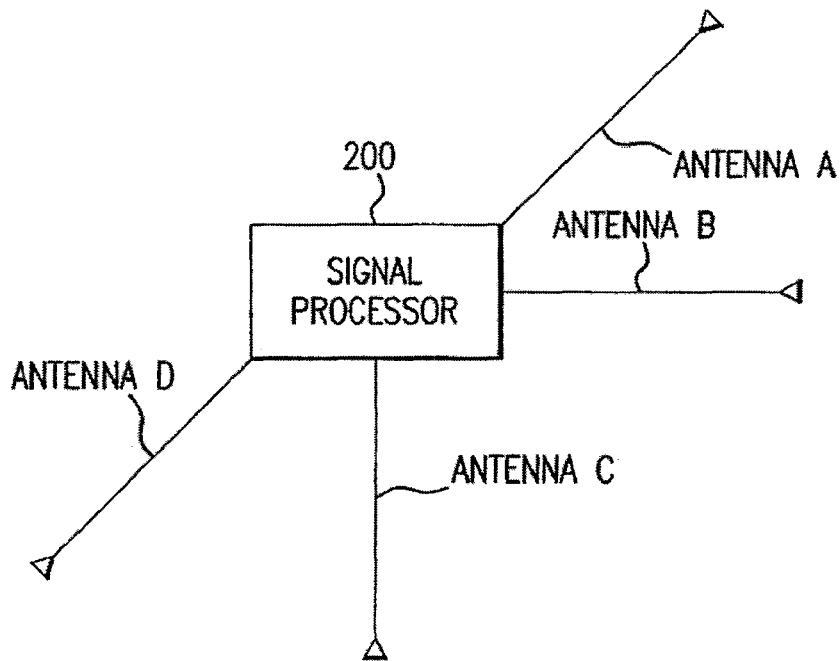
FIG. 2 illustrates a system in which the present invention can be employed.

In accordance with an embodiment of the present invention, a receiver system has a plurality of antennas that are diverse so as to maximize the receipt or capture of signals from a transmitter. These multiple antennas may be placed in different orientations with respect to one another so as to capture the same signal transmitted from the base station, but in different positions thereby adapting to the multiple paths that the signal may traverse between the transmitter and the receiving station. An example of such an arrangement of diverse antennas is illustrated in a block diagram form in FIG. 2. Here a system of four antennas is shown. This should not be taken as a restrictive number. More or fewer antennas may be used in a given system depending on the multi-path fading which might be expected from the channel. All of the antennas are coupled to a signal processor arrangement which takes the signals captured by the respective antennas and ultimately combines them into a meaningful information signal representative of the information sent from the transmitter. The present invention involves itself with the processing of the captured signals as it is performed in the signal processor 200.

In general, the present invention takes advantage of the known technique of utilizing a pilot tone on a given one of the multiple tones to establish a base line or initial complex coefficient representative of the channel's characteristics. Say for example, a known symbol was to be transmitted on frequency F1 on a first transmission in the OFDM system, then F1 would be considered a pilot tone and the receiver processing would be looking for that specific symbol on the pilot tone on the captured first transmission signal from each of the multiple antennas. A compensation for a given antenna, as each antenna has its own path or channel between that antenna orientation and the transmitter, would include an initial calculation of a complex coefficient for the channel generated by comparing the detected symbol on the pilot tone versus what is expected to have been placed on the pilot tone. This comparison yields a primary or a first stage complex coefficient channel. The present invention then improves upon this known technique by looking at information signals captured by the same antenna, such as those on frequencies F2 to F6 and determining that some subset of those symbols and respective carriers can be treated as if they were pilot tones. That is, an estimation is made of the probability that the signal processor has correctly identified or detected the information symbol on that information carrier using the corrected version of the information signal generated from the primary complex coefficient of the channel. If there is a sufficient probability that the detected symbol does correspond to the symbol transmitted on that information carrier, then that information carrier is treated as if it were a pilot tone and the received signal is compared to the ideal symbol to create an increased number of reference points for calculation of the complex coefficient. As more pseudo pilot tones are used in connection with a given receiving antenna, the effect of the noise on each of the frequencies can be factored into the calculation with the hope being that the impact of the noise as a separate element can be reduced.

Figure 3:
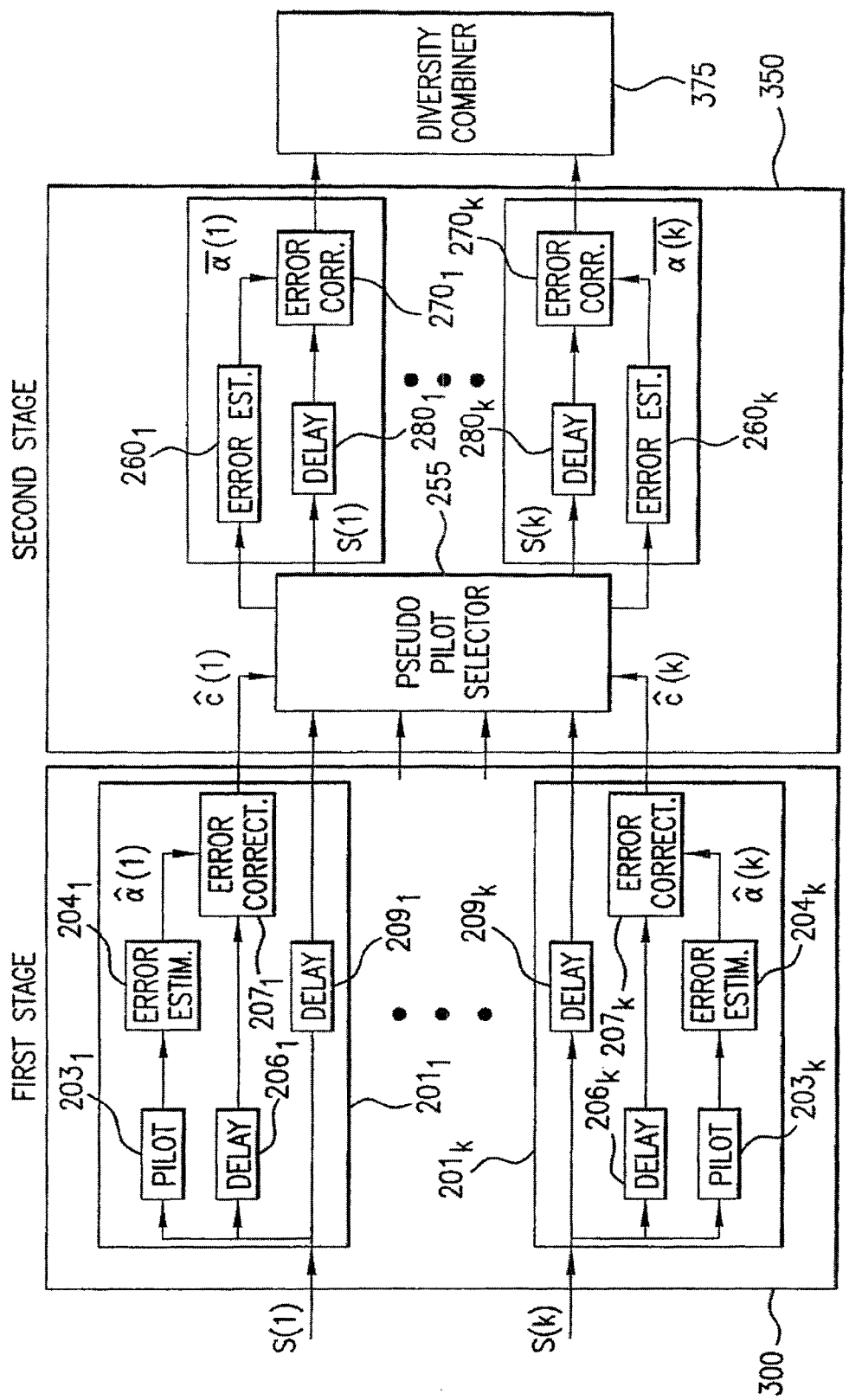
FIG. 3 illustrates a block diagram of a signal processor arrangement in accordance with an embodiment of the present invention.

FIG. 3 illustrates in block diagram form a processing arrangement which roans his series of operations. First, for reference purposes, it is assumed that there are "k" receiver antennas. It is also assumed that there are N carrier tones. The signals received by the various k antennas are represented as S(1) to S(k). These signals impliedly include all N tones captured by their respective antennas.

The processing arrangement of the present invention operates in at least two stages, 300 and 350. The first stage employs the well known technique of detecting some aspect of the channel characteristics based on a known pilot symbol. Here the first stage is shown as having discrete processing elements $201_1$ to $201_k$ for each of the k antennas. While the drawing shows discrete processing for symbols received on each of those antennas, it is not necessary for purposes of this invention that the elements performing that processing be in fact physically discrete elements. Looking for example at the element $201_1$, a pilot detector $203_1$ detects the symbol on the pilot tone and an error estimator $204_1$ performs error estimation based on comparing the detected symbol to the expected symbol on the pilot tone. The information carriers on the first antenna are subjected to a time delay device 206 which delays the signals S(1) for a time that corresponds to the time period necessary for the error estimation operation to be performed.

The delayed signal and the error estimation $\hat{\alpha}(1)$ are provided to an error correction device $207_1$ which generates a corrected version of the information symbols captured by that antenna. This corrected version of antenna 1's symbols is represented by $\hat{c}(1)$. As this error correction operation entails additional processing time, a second delay device 209, delays the entire captured signal (S(1)) for the period of time needed to allow all of the other processing to occur before the delayed signal is transmitted to the second stage 350 of the processing operation. As is suggested by FIG. 3, these first stage processing operations can be performed with respect to each of the k antennas.

As a consequence, the second stage of the operation receives corrected versions of the captured signals of each receiving antenna and the captured signals themselves. All of this information is provided to a pseudopilot selector, 255. The pseudo pilot selector's job is to select among the information signals for each of the captured signal sets to determine a subset of information signals which can be treated as if they were additional pilot tones even though they in fact carry information. This can be achieved by determining a probability that a symbol detected from a given information carrying tone is the correct symbol and corresponds to that transmitted. When there is a high degree of certainty or a sufficient degree of certainty, namely that the probability exceeds a satisfactory threshold, then that information carrier can be included in a reference set of information carriers which will have an impact on a second calculation of the channel coefficient. In this instances the second stage performs a second error estimation with second error estimator 260, based on those carrier signals which have been identified as pseudo pilots, that is carriers in which the system has a high degree of confidence it has accurately detected the information carried on those tones. Once the secondary error estimation factor, $\overline{\alpha}(1)$, is detected, then the information signal captured on that respective antenna, here S(1), having been delayed for a time period necessary to ascertain his secondary error correction, is subjected to a correction with second error correction device, 270$_1$. This secondary error correction provides an enhanced compensation for channel characteristics and this enhanced compensated signal is transferred to the diversity combiner 375 where the system picks up the processing that was done in the art for combining information signals from a plurality of diverse antennas. As can be seen from the drawing figure, separate elements can be provided in connection with each of the diverse antennas in the second stage as well. These elements need not be discrete and separate elements, however.

The selection of the pseudo pilot signals relies upon a presumption that the system can identify those tones at which the difference between the estimate of a symbol and the true symbol on that tone, which is simply $\delta_t k = \delta_t - c_i$ is so small that the estimated datapoint $\hat{c}(k)$ remains inside the correct decision boundaries for $c_i$ (that is, a correct decision has been made), the coefficient can be estimated using the signal associated with this datapoint that is, $$\tilde{\alpha}_i(k) = \frac{s_i(k)c_i^*}{|c_i|^2} \quad \text{Equation 1}$$
$$= \alpha(k) + \Delta_i(k)$$

For N data points or OFDM tones, the average value of the coefficient is $$\overline{\alpha(k)} = \frac{1}{N}\sum_{i=1}^{N}\frac{s_i(k)c_i^*}{|c_i|} \quad \text{Equation 2}$$
$$= \alpha(k) + \frac{1}{N}\sum_{i=1}^{N}\Delta_i(k)$$

The error term with a factor of 1/N indicates that a more accurate estimate can be obtained. However, the assumption that all signals result in correct decisions is an unrealistic and unreasonable one. In reality, each data point has a probability that it will lead to a correct decision. That is, given a data point, it may lead to a correct or wrong decision. Furthermore, if all the correct decisions can be obtained, there is no need to reduce the estimation error.

The probability of leading to a correct decision is a conditional probability, which is normally written as $p_i = p[\hat{c}(k) = \mu | c = \mu]$ (that is, the probability that the estimated symbol is μ given that the symbol μ is transmitted). If one is able to pick those signals from the captured signal having a higher conditional probability amongst all the signals, one should be able to use above equation 2 where N would correspond to the number of picked signals.

An additional factor comes into play where there are multiple diversity branches that can be used for selecting the suitable signals. If the signals from all the branches, $s_i(\mathbf{1})$, $s_i(k)$ lead to the same decision (that is, they are within the same decision boundaries) this decision should have a higher probability to be correct than in cases that they do not. That is, it is possible to look at a given tone over a plurality of the antennas and determine if the detected value of that information symbol on that tone matches across those diverse antennas. Where there is such a match, there is a higher probability that the detected symbol on that carrier tone in fact corresponds to the transmitted symbol. Thus, one can use this diversity branch information to select a set of symbols on given diversity antennas as pseudo pilot tones since they have the appropriate level of probability that they correspond to the correct or transmitted symbol. This permits the same type of improvement to arise in the compensation scheme as would arise where multiple pilot tones are employed, however, it avoids taking up unnecessary channel capacity in gaining this improvement.

Simulation results generated in testing out this operation may be helpful for understanding the impact of the present invention.

Figure 4:
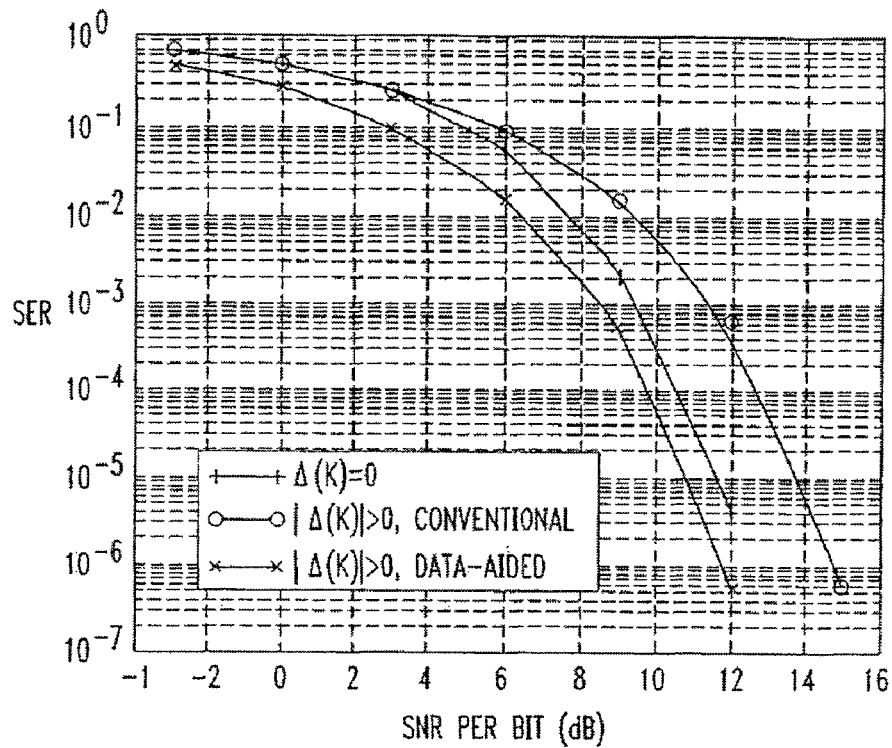
FIGS. 4 to 6 are plots for showing the results of a simulation of the present invention.
Figure 5:
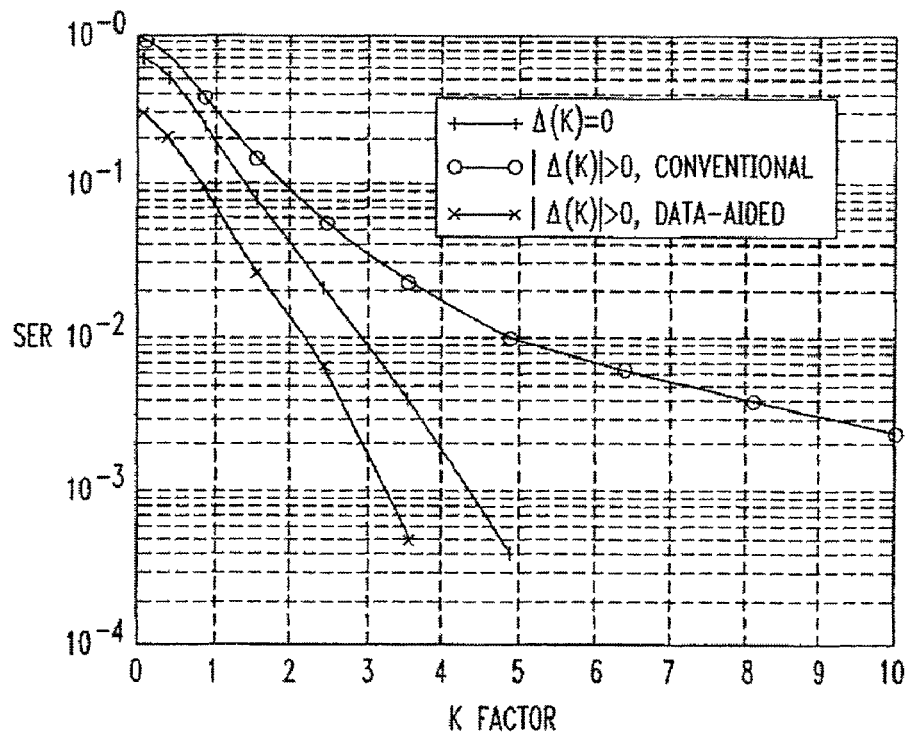

A number of numerical examples in terms of symbol error rate (SER) versus signal-to-noise ratio (SNR) are given here to illustrate the improvement by using the data-aided method. FIG. 4 shows the SER performance against the SNR for 16-QAM modulation with two-branch (K=2) MRC under Gaussian channel conditions. In the simulations, two complex terms are applied to the received signals at the two branches, respectively, to emulate the complex coefficients. For the SER curves with estimation errors (i.e., $|\Delta(k)|>0$), the SNR of the pilot is the same as that of the data. By comparing the curve without estimation error with that obtained by using conventional method, the degradation in SNR is about three decibels at high SNR. The SER curve obtained by using the data-aided method shows that the loss in SNR is cut at least by two decibels. FIG. 5 illustrates the SER performance as a function of the Ricean K Factor, where SNR per bit is 15 dB. The results show that the performance improvement by using the data-aided method is more substantial as the value of the Ricean K factor increases.

Figure 6:
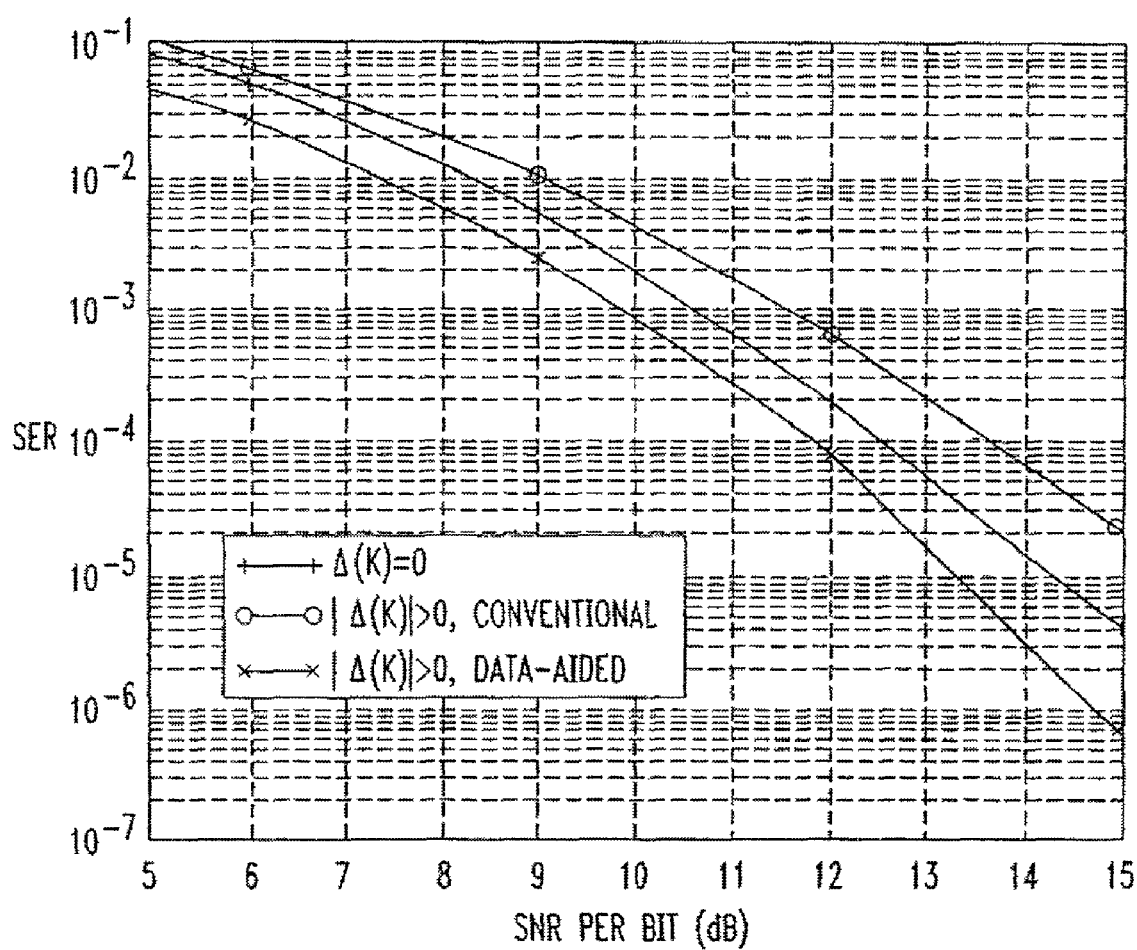

The final example given here is a case where the parameters used in the simulation are close to the values in a practical environment where a fixed wireless access network may operate. In the simulation, the Ricean K factor is set to be five. The SNR of the pilot signal is three decibels higher Man that of the data signals. The number (3 dB) accounts for the fact that the corner symbols of the 16-QAM constellation are used for pilots and their power is 2.6 dB higher the average power of 16-QAM signals. The results are shown in FIG. 6, from which two observations can be made:

1. By comparing the SER curve without estimation error with that obtained by using conventional method, the degradation in SNR is at least two decibels at high SNR;

2. The SER curve obtained, by using the data aided method shows that the improvement in terms of SNR is more than one decibel over the case of the conventional method. In effect, the loss in terms of SNR due to the entire error compensation process is less than a decibel.

In summary, the present invention provides a technique which builds upon the technique of using pilot tones to detect a complex coefficient of a channel in that it selects from a plurality of information carrying tones, those tones which can operate as pseudo pilot tones. Those pseudo pilot tones can then be employed in an error estimation and an error correction operation which reduces the overall effect or impact of noise on the calculation of the complex coefficient for the channel.

What is claimed is:

1. An apparatus comprising:
a pseudo pilot selector adapted to process a plurality of corrected non-pilot tones of a multi-toned signal to select, based on a probability that information symbols of non-pilot tones have been correctly identified, a subset of the corrected non-pilot tones of the signal; and
an error estimator, coupled to the pseudo pilot selector, adapted to form an error estimate of a channel effect based on the selected subset of corrected non-pilot tones.

2. The apparatus of claim 1, further comprising:
a first error correction portion adapted to perform error correction on the non-pilot tones of the multi-toned signal based on a second error estimate of a channel effect generated based on a pilot tone of the multi-toned signal.

3. The apparatus of claim 2, further comprising:
a second error correction portion adapted to receive the error estimate of the channel effect from the error estimator and to perform a second error correction on the non-pilot tones of the multi-toned signal based on the received error estimate.

4. The apparatus of claim 1, wherein the pseudo pilot selector is operable to select the subset based on the corrected non-pilot tones of the multi-toned signal matching corrected non-pilot tones of at least a second multi-toned signal, the multi-toned signal and the second multi-toned signal being received over different antennas.

5. The apparatus of claim 1, wherein the pseudo pilot selector is operable to select the subset based on a difference between the corrected non-pilot tones of the multi-toned signal and the non-pilot tones of the multi-toned signal.

6. A method comprising:
generating a first compensated version of a signal based on the signal and a first error factor based on symbols received on a set of information carriers of the signal, the set of information carriers including at least one information carrier of the signal and a pilot tone of the signal, the at least one information carrier being selected based on the signal and a second compensated version of the signal.

7. The method of claim 6, further comprising:
generating the second compensated version of the signal based on the signal and a second error factor based on symbols received on a pilot tone of the signal.

8. The method of claim 6, further comprising:
determining the set of information carriers based on whether a symbol received on an information carrier of the signal received over a first antenna matches a second symbol received on a corresponding information carrier of another version of the signal received over a second antenna.

9. The method of claim 6, further comprising:
determining the set of information carriers based on a difference between a symbol of an information carrier of the signal and a corresponding symbol of an information carrier of the second compensated version of the signal.

10. The method of claim 6, further comprising:
generating the second error factor based on symbols received on the pilot tone of the signal.

11. The method of claim 6, further comprising:
generating the first error factor based on symbols received on the set of information carriers.

12. The method of claim 6, wherein the signal is an orthogonal frequency division multiplexed (OFDM) signal and the pilot tone is one tone of the OFDM signal and the information carriers are other, non-pilot tone, information-bearing tones of the OFDM signal.

13. An apparatus comprising:
a pseudo pilot selector operable to select at least one information carrier of a signal other than a pilot tone of the signal to be included in a set of information carriers, the at least one information carrier being selected based on a first compensated version of the signal; and
a first error corrector operable to generate a second compensated version of the signal based on the signal and a first error factor based on symbols received on the set of information carriers.

14. The apparatus of claim 13, wherein the set of information carriers is selected based on whether a symbol received on an information carrier of the signal received over a first antenna matches a second symbol received on a corresponding information carrier of another version of the signal received over a second antenna.

15. The apparatus of claim 13, wherein the set of information carriers is selected based on a difference between a symbol received on an information carrier of the signal and a corresponding symbol of an information carrier of the first compensated version of the signal.

16. The apparatus of claim 13, further comprising:
a first error estimator operable to generate the first error factor based on symbols received on the at least one information carrier of the set of information carriers.

17. The apparatus of claim 13, further comprising:
a second error corrector operable to generate the first compensated version of the signal.

18. The apparatus of claim 13, wherein the pseudo pilot selector selects the at least one information carrier from information carriers of a plurality of signals received on a plurality of antennas.

19. The apparatus of claim 13, further comprising:
a plurality of additional first error correctors operable to generate respective second compensated signals based on signals received on corresponding antennas of a plurality of antennas and the first error factor; and
a diversity combiner operable to combine the second compensated signals.

20. The apparatus of claim 13, wherein the signal is an orthogonal frequency division multiplexed (OFDM) signal and the pilot tone is one tone of the OFDM signal and the at least one information carrier includes another, non-pilot tone, information-bearing tone of the OFDM signal.

* * * * *